United States Patent
Patti et al.

(12) 
(10) Patent No.: US 6,512,645 B1
(45) Date of Patent: Jan. 28, 2003

(54) CIRCUIT AND METHOD FOR WRITING TO A MEMORY DISK WITH A BOOSTED VOLTAGE

(75) Inventors: Giuseppe Patti, San Jose, CA (US); Roberto Alini, Pleasanton, CA (US); Elango Pakriswamy, Santa Clara, CA (US)

(73) Assignee: STMicroelectronics Inc., Carrollton, TX (US)

( * ) Notice: Subject to any disclaimer, the term of this patent is extended or adjusted under 35 U.S.C. 154(b) by 0 days.

(21) Appl. No.: 09/393,231

(22) Filed: Sep. 9, 1999

(51) Int. Cl.⁷ .................................................. G11B 5/09
(52) U.S. Cl. ............................ 360/46; 360/68; 327/110
(58) Field of Search ............................... 360/46, 67, 68, 360/61; 327/108, 110, 423, 424

(56) References Cited

U.S. PATENT DOCUMENTS

| | | |
|---|---|---|
| 4,937,802 A | 6/1990 | Omori et al. |
| 5,041,773 A | 8/1991 | Takahashi |
| 6,052,017 A | 4/2000 | Pidutti et al. |
| 6,121,800 A | 9/2000 | Leighton et al. |
| 6,201,421 B1 * | 3/2001 | Takeuchi et al. ............ 327/110 |
| 6,236,246 B1 | 5/2001 | Leighton et al. |
| 6,252,450 B1 * | 6/2001 | Patti et al. .................. 327/424 |

* cited by examiner

*Primary Examiner*—Alan T. Faber
(74) *Attorney, Agent, or Firm*—Lisa K. Jorgenson; Andre Szuwalski

(57) ABSTRACT

A method and circuit are disclosed for controlling the write head of a magnetic disk storage device. The circuit includes a pull-up device coupled to a terminal of the write head, a current sink circuit which is coupled to the write head terminal and a bootstrap circuit coupled to the current sink circuit. When reversing the direction of current flow through the write head so that current is drawn from the write head from the write head terminal, the bootstrap circuit and the current sink circuit are activated. When the current in the write head nears and/or slightly surpasses the desired destination current level, the bootstrap circuit is deactivated and the pull-up device is thereafter immediately activated for a predetermined period of time.

42 Claims, 4 Drawing Sheets

CIRCUIT AND METHOD FOR WRITING TO A MEMORY DISK WITH A BOOSTED VOLTAGE

BACKGROUND OF THE INVENTION

1. Technical Field of the Invention

The present invention relates to circuit and method for writing to a memory disk, and particularly to a circuit and method for driving the write head of a disk drive device.

2. Background of the Invention

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits used to supply such write signals to the heads included preamplifier circuits to drive the current through selected legs of an "H-bridge" circuit, which is capable of allowing relatively fast current reversals for accurate data reproduction.

Figure 1:
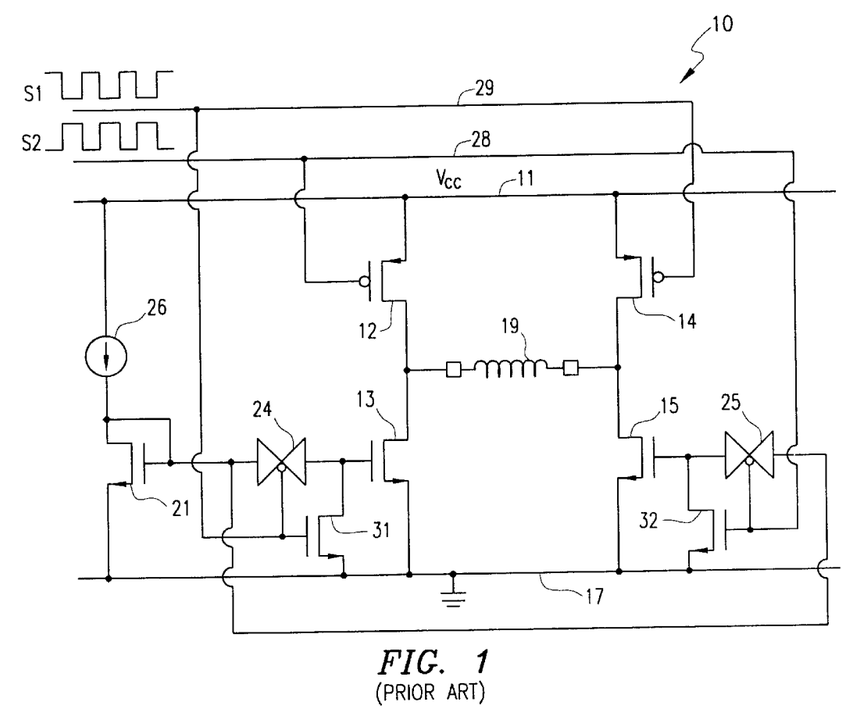
FIG. 1 illustrates a schematic diagram of a conventional H-bridge driver circuit for a write head of a disk storage device.

An example of a typical H-bridge write head data driving circuit 10, according to the prior art, is shown in FIG. 1. The circuit 10 includes four MOS transistors, 12–15 connected between a $V_{cc}$ voltage 11 and ground reference 17. A coil 19, used, for example, to supply data pulses for writing to a disk drive media is integrated into the write head mechanism. The coil 19 is connected between the center legs of the H-bridge, as shown.

It can ben seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistor 12 and 14 serve as switching transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above.

Thus, the data drive signals supplied to the head mechanism associated with the circuit 10 may be controlled by applying appropriate signals to the input lines 28 and 29. However, as mentioned, as data rates increase, the rates at which the heads can accurately write the data to the magnetic media is limited by the speed at which the flux in the coil 19 (and its associated components) can be reversed. The maximum data rate is thus limited to the maximum physical flux reversal rate of the driver circuitry.

What is needed, therefore, is a method and circuit for driving an inductive load of the type used in conjunction with a write head of a disk drive with a signal that enables a maximum flux reversal rate in the driver coil.

SUMMARY OF THE INVENTION

The present invention overcomes the shortcomings in prior systems and thereby satisfies a significant need for a driver circuit for the write head of a disk storage device. The driver circuit provides a current to the write head so that current flows through the write head in one direction or the other. The driver circuit includes a pair of identical sub-circuits, each sub-circuit being connected to a distinct terminal of the write head. Each driver sub-circuit forms a leg of an H-bridge driver circuit.

Each driver sub-circuit includes a first pull-up and/or switching device having a first terminal connected to a high voltage reference and a second terminal coupled to the corresponding write head terminal. The driver sub-circuit further includes a current sink circuit capable of sinking current from the corresponding terminal of the write head. The driver circuit further includes a control circuit connected to the first pull-up device and the current sink circuit of each driver sub-circuit, for controlling current flow through the write head so as to write data on a corresponding magnetic storage disk.

In general terms, the control circuit activates the first pull-up device of one driver sub-circuit so as to provide a current to one terminal of the write head, while activating the current sink circuit of the other driver sub-circuit in order to sink the provided current from the other terminal of the write head. In this way, the control circuit is capable of passing a predetermined current level through the write head in either direction as desired to write data on the magnetic storage disk.

As stated above, it is desirous for H-bridge driver circuits to cause the current flowing through the write head to relatively quickly switch directions. In order to lessen the transition time between the desired steady state current level flowing through the write head in one direction and desired steady state current level flowing therethrough in the opposite direction, each driver sub-circuit further includes a bootstrap circuit for temporarily pulling the voltage appearing at the corresponding write head terminal below the low voltage reference. The bootstrap circuit causes the voltage appearing across the write head to relatively quickly become substantially large, thereby causing a relatively large amount of current to pass through the write head. Consequently, the current flowing through the write head quickly transitions from one steady state current level to the other.

The bootstrap current sink circuit is activated by the control circuit for a first predetermined period of time corresponding to the current level in the write head approximately reaching or relatively slightly surpassing (i.e., overshooting) the intended destination steady state current level. The control circuit thereupon deactivates the bootstrap circuit so as to limit the amount of overshoot of current flowing through the write head. Because there may be an appreciable amount of ringing at the corresponding write head terminal despite the deactivation of the bootstrap circuit, each driver sub-circuit further includes a second pull-up device coupled to the corresponding write head terminal. The second pull-up devices are utilized to relatively quickly force the write head current to the destination steady state current level.

In particular, substantially immediately after the bootstrap circuit is deactivated by the control circuit, the second pull-up device associated with the same write head terminal is temporarily activated by the control circuit for a second predetermined period of time. The activated pull-up device pulls the voltage level appearing at the corresponding write head terminal towards the voltage level appearing on the other write head terminal. At the end of the second predetermined period of time, the voltage across the write head is near zero volts, thereby yielding a substantially constant current through the write head at the desired steady state current level. The current flowing through the write head is maintained at approximately the desired steady state current level by the current sink circuit following deactivation of the activated second pull-up device. In this way, the time associated with reversing current through the write head is minimized without experiencing substantial current overshoot or undershoot relative to the desired destination steady state current level.

According to a preferred embodiment of the present invention, each driver sub-circuit includes a protection transistor connected in series between the first and second pull-up devices and the corresponding terminal of the write head. For each protection transistor, the control terminal is tied to a fixed voltage so that a finite on resistance is created between the two current conducting terminals of the protection transistor. The voltage swings or voltage differentials appearing across the terminals of each of the pull-up devices are correspondingly reduced. The reduced voltage swing appearing across the terminals of each of the pull-up devices allows for the pull-up devices to be implemented with low voltage transistors having lower breakdown voltages, which results in increased circuit performance.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

Figure 2:
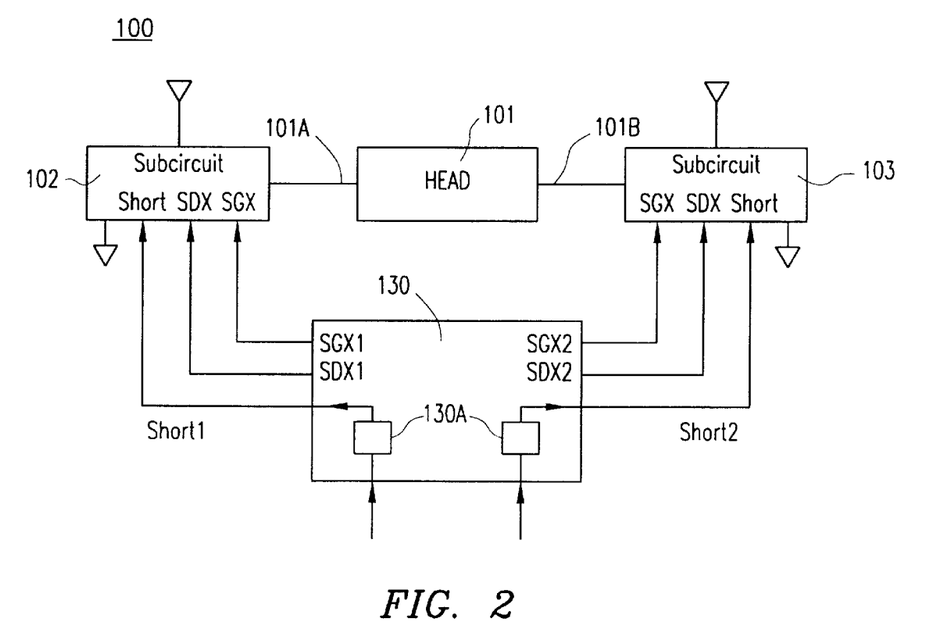
FIG. 2 illustrates a schematic block diagram of a driver circuit for a write head of a disk storage device according to a preferred embodiment of the present invention.

Referring to FIG. 2, there is shown a driver circuit 100 for driving the write head 101 of a magnetic disk storage device. Driver circuit 100 is implemented as an H-bridge circuit wherein current is provided to write head 101 through selected legs of driver circuit 100 for writing data onto an associated magnetic storage disk.

Driver circuit 100 includes a pair of identical sub-circuits 102 and 103, each of which is associated with a distinct terminal of write head 101. Sub-circuit 102 supplies a current to and sinks a current from write head 101 through terminal 101A thereof. Similarly, sub-circuit 103 supplies a current to and sinks a current from write head 101 through terminal 101B thereof. In this way, simultaneously controlling sub-circuits 102 and 103 provides a current through write head 101 having the desired current level and direction.

Sub-circuit 102 of driver circuit 100 (FIG. 3) includes a pull-up device connected between terminal 101A of write head 101 and a high voltage reference, Vdd. In a preferred embodiment of the present invention, the pull-up device is implemented as a p-channel transistor 104 having a source terminal connected to Vdd and a source terminal coupled to write head terminal 101A. By controlling the gate terminal of the p-channel transistor 104 with a control signal SDX, pull-up transistor 104 serves as a switching transistor in selectively sourcing a current to write head 101 through write head terminal 101A.

Figure 3:
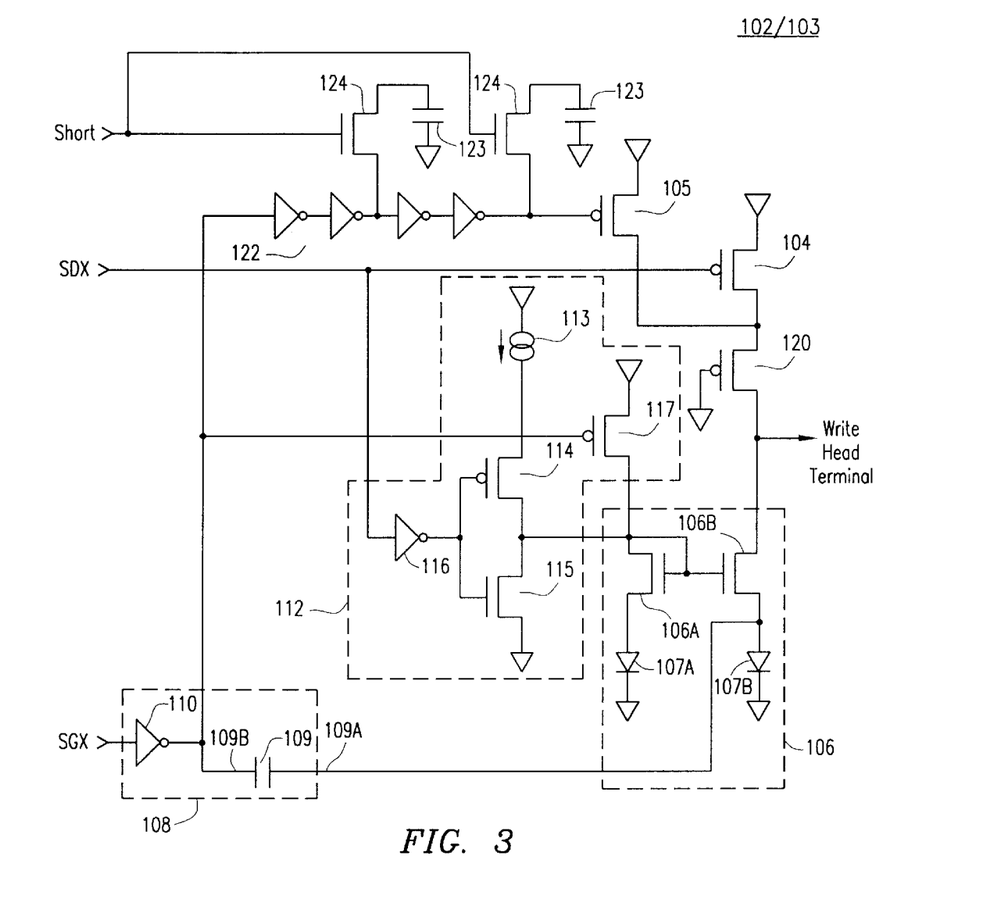
FIG. 3 illustrates a schematic diagram of each sub-circuit forming the driver circuit shown in FIG. 2.

Sub-circuit 102 of driver circuit 100 further includes a current sink circuit 106 for selectively sinking current from write head 101 through write head terminal 101A. Current sink circuit 106 is configured as a current mirror formed by transistors 106A and 106B. Current is provided to transistor 106A from one or more current sources, as explained below. The current passing through transistor 106A in a first leg of the current mirror is mirrored in current flowing through transistor 106B of a second leg of the current mirror. Current sink circuit 106 further includes a pair of diodes 107A and 107B, which are respectively connected to the source terminal of transistors 106A and 106B. Diodes 107A and 107B serve to prevent current from flowing in the wrong direction through the first leg and the second leg, respectively, of the current mirror of current sink circuit 106.

Driver sub-circuit 102 further includes a boost or bootstrap circuit 108 for relatively rapidly pulling the write head terminal 101A corresponding thereto to a voltage so that the voltage appearing across write head 101 is relatively large, thereby causing a relatively rapid transition of current between steady state current levels. In a preferred embodiment of the present invention, bootstrap circuit 108 includes a capacitor 109 having a first plate terminal 109A connected along the second leg of the current mirror of current sink 106, and particularly to a current conducting terminal of transistor 106B. Bootstrap circuit 108 further includes a logic driver, such as a logic inverter 110, which drives the second plate terminal 109B of capacitor 109. By switching inverter 110 from providing a logic high output to a logic low output and with a substantial voltage initially appearing across capacitor 109, the first plate terminal 109A thereof is capable of being pulled below the low voltage reference Vss, utilized by sub-circuit 102.

Driver sub-circuit 102 further includes switching circuitry 112 for providing a current to transistor 106A of current mirror/sink circuit 106. Specifically, switching circuitry 112 includes a current source 113, a pull-up transistor 114 connected in series between current source 113 and the drain terminal of transistor 106A, and a pull-down transistor 115 connected between the drain terminal of transistor 106A and ground. The control or gate terminals of p-channel pull-up transistor 114 and n-channel pull-down transistor 115 are driven by a logic inverter 116. By controlling the input of logic inverter 116 with a control signal SDX, switching circuitry 112 is capable of providing a predetermined amount of current to transistor 106A so as to activate the current mirror of current sink circuit 106.

Switching circuitry 112 further includes a second pull-up transistor 117 connected between the high voltage reference, Vdd, and transistor 106A of current sink circuit 106. Transistor 117 is sized to provide a substantially small on resistance such that a relatively large amount of current may be provided to current mirror/sink circuit 106. By driving the control or gate terminal of transistor 117 with a control signal that is substantially independent of control signal SDX, the amount of current provided to the current mirror of current sink circuit 106 may be varied as desired.

FIG. 3 shows sub-circuit 102 implemented with both n-channel and p-channel MOS transistors. It is understood that the sub-circuits 102 may be implemented with p-channel MOS transistors, n-channel MOS transistors and/or other types of transistors.

Sub-circuit 102 further includes a second pull-up transistor 105 having a drain terminal coupled to write head terminal 101A. The control or gate terminal of pull-up transistor 105 is driven by a control signal SGX through delay chain 122. A detailed description of the activation of transistor 105 is described below.

Because write head terminal 101A is capable of being pulled below the low voltage reference Vss, the voltage differential appearing across the terminals of each of pull-up transistors 104 and 105 increases accordingly. Although the resulting increase in voltage differential appearing on transistors 104 and 105 would ordinarily require the use of high voltage MOS transistors, such use is unfavorable due to the fact that high voltage MOS transistors are, among other things, more expensive to fabricate and integrate with low voltage MOS transistors having lower breakdown voltages, and are slower in operation due to the relative size of the parasitic components associated with high voltage MOS transistors. To improve the performance and lower the cost associated with controlling write head 101, driver circuit 100 of a preferred embodiment of the present invention includes components which eliminate the need for using high voltage transistors, by protecting the maximum voltage swings or voltage differentials appearing across each transistor.

Specifically, driver sub-circuit 102 includes a p-channel "protection" transistor 120 which is connected in series between write head terminal 101A and pull-up device 104. The gate terminal of each of protection transistor 120 is biased at a voltage reference so that a finite on resistance exists between the drain and source terminals thereof. As shown in FIG. 3, the gate terminal of protection transistor 120 is tied to the low voltage reference. In this way, when pull-up device 104 is activated to provide a current to write head 101 through write head terminal 101A, a non-zero voltage drop appears across protection transistor 120 so that the voltage differentials appearing across the terminals of pull-up transistor 104, such as the gate-drain voltage differential of transistor 104, is reduced. The reduction in the voltage differentials across the terminals of pull-up transistor 104 allows for transistor 104 to have a thinner gate oxide and thereby possess improved operating characteristics without experiencing a breakdown condition.

It is understood that the specified bias applied to the gate terminal of and the size of protection transistor 120 depends upon the desired operating characteristics of driver circuit 100, such as the power supply voltage Vdd, the desired gate oxide thicknesses for transistor 104, the desired data rate, and the desired power dissipation. One preferred embodiment of the present invention may determine the gate terminal bias and the size for protection transistor 120 based upon a predetermined supply voltage Vdd and upon each transistor in driver circuit 100 having the same gate oxide thickness.

As stated above, driver sub-circuit 103 of driver circuit 100 is identical to driver sub-circuit 102 and thus itself includes a pull-up device 104, a current sink circuit 106 configured as a current mirror, a bootstrap circuit 108 for pulling write head terminal 101B below the low voltage reference, switching circuitry 112 for controlling current flow to the current mirror, and protection transistor 120 for reducing the voltage swings across the terminals of pull-up transistor 104. Due to identical nature of sub-circuit 103 to sub-circuit 102, a detailed description of sub-circuit 103 is unnecessary.

According to a preferred embodiment of the present invention, driver circuit 100 further includes a control circuit 130 for generating signals that control the activation of pull-up devices 104 and 105, current sink circuit 106, bootstrap circuit 108 and switching circuitry 112 of sub-circuits 102 and 103. Control circuit 130 may form a portion of the circuitry located in a controller for a disk storage device in which driver circuit 100 may be disposed. Alternatively, control circuit 130 is instead separate from the controller and receives as its input signals generated thereby.

For each driver sub-circuit 102 and 103, control circuit 130 generates a distinct control signal SGX (FIG. 2) which activates bootstrap circuit 108, current sink circuit 106, pull-up device 104 and portions of switching circuitry 112. Control circuit 130 additionally generates a distinct control signal SDX for each sub-circuit 102 and 103, for also controlling portions of switching circuitry 112 and pull-up device 104, as explained below.

In general terms, control circuit 130 activates pull-up device 104 of sub-circuit 102 and current sink circuit 106 of sub-circuit 103 in order for a predetermined steady state current level to flow through write head 101 in a first direction (from write head terminal 101A to write head terminal 101B as shown in FIG. 2). Likewise, control circuit 130 activates pull-up device 104 of sub-circuit 103 and current sink circuit 106 of sub-circuit 102 in order for a predetermined steady state current level to flow through write head 101 in a second direction (from write head terminal 101B to write head terminal 101A as shown in FIG. 2). In writing data onto a magnetic storage disk, control circuit 130 switches sub-circuits 102 and 103 between these two steady states.

As stated above, it is desirous to be able to quickly reverse the direction of current flowing through write head 101 in order to reduce the rate at which data can be written onto a magnetic storage disk. Accordingly, during the time the current flowing through write head 101 transitions between the two current levels, control circuit 130 temporarily activates one of the bootstrap circuits 108 and corresponding switching circuitry 112 in order to draw a relatively large voltage drop across write head 101. In particular, when control circuit 130 activates a current sink circuit 106 so as to sink current from write head 101, control circuit 130 activates the bootstrap circuit 108 and switching circuitry 112 associated therewith. By activating the appropriate bootstrap circuit 108 and switching circuit 112 so as to relatively rapidly provide a relatively large voltage drop across write head 101 and configure current sink/mirror 106 to be capable of sinking a relatively large amount of current, a relatively large amount of current flows through write head 101 and the second leg of current sink/mirror circuit 106, thereby decreasing the rise/fall time for current in write head 101 when transitioning between the two steady state current levels.

Due to the increase in current being drawn from write head 101 through a current sink circuit 106 during the time sub-circuits 102 and 103 are transitioning between the two steady states, the current passing through write head 101 will have a greater tendency to overshoot the destination or final steady state current level (i.e., the steady state current level in write head 101 following the reversal of current direction). In order to reduce the overshoot of the current passing through write head 101, control circuit 130 deactivates the previously-activated bootstrap circuit 108 and corresponding switching circuitry 112 when the current passing through the write head 101 relatively slightly surpasses the destination steady state current level. In this way, the overshoot of the current passing through write head 101 is reduced.

Although the deactivation of the activated bootstrap circuit 108 and corresponding switching circuitry 112 reduces current overshoot through write head 101, an unacceptable amount of current overshoot and undershoot may nonetheless occur relative to the destination steady state current level. In addition to deactivating bootstrap circuit 108 and corresponding switching circuitry 112, control circuit 130 thereafter temporarily activates the pull-up device 105 associated with the deactivated bootstrap circuit 108, in order to pull the corresponding write head terminal 101A or 101B towards the voltage appearing at the other write head terminal until the voltage across write head 101 is approximately zero volts. Without a voltage drop across write head 101 and noting that write head 101 may be modeled as an inductance, the current flowing through write head 101 is substantially constant at the destination steady state current level. As a result, the temporary activation of the appropriate pull-up device 105 following the deactivation of the corresponding bootstrap circuit 108 forces the current flowing through write head 101 to relatively rapidly approach the destination steady state current level without an appreciable overshoot or undershoot.

As stated above, control circuit 130 activates the appropriate bootstrap circuit 108 and corresponding switching circuitry 112 (pull-up transistor 117) for the time period during which the current level flowing through write head 101 transitions between two steady state current levels. Because the operating characteristics of write head 101 may vary considerably, the activation time for bootstrap circuits 108 and transistors 117 is preferably programmable. In the same way, the time period of temporary activation of pull-up devices 105 immediately following the respective activation of bootstrap circuits 8 is programmable.

Specifically, each control signal SGX is an active high control signal that activates the corresponding bootstrap circuit 108 in addition to temporarily activating the corresponding pull-up devices 105. For each sub-circuit 102 and 103, the assertion of corresponding control signal SGX and its logical inversion by inverter 110 pulls the corresponding write head terminal 101A or 101B below the ground potential throughout the duration of the pulsewidth of control signal SGX. The logical inversion of control signal SGX also activates pull-up transistor 117 of switching circuitry 112 throughout the duration of the pulsewidth of control signal SGX so that an additional amount of current is supplied to the current mirror of current sink circuit 106. The logical inversion of control signal SGX drives the gate terminal of pull-up transistor 105 such that transistor 105 is activated for a period of time substantially matching the pulsewidth of control signal SGX. By providing circuitry within control circuit 130 for setting the pulsewidth of control signal SGX to the desired length, such as by use of a delay element 130A (FIG. 2), the timing with respect to the operation of sub-circuits 102 and 103 may be relatively accurately controlled.

Further, each sub-circuit 102 and 103 includes a delay chain 122 for delaying the assertion of the appropriate control signal SGX for a predetermined period of time until the control signal SGX reaches the gate terminal of pull-up transistor 105. In this way, the activation of the appropriate pull-up transistor 105 is suitably delayed following activation of corresponding bootstrap circuit 108 by corresponding control signal SGX.

As stated above, for each sub-circuit 102 and 103, pull-up transistor 105 is activated for a predetermined period of time (the pulsewidth of control signal SGX) immediately following the time during which corresponding bootstrap circuit 108 is activated. Accordingly, the delay through delay chain 122 is preferably approximately the same as the pulsewidth of control signal SGX. The delay through delay chain 122 may be made programmable in order to closely match the delay with the timing for the pulsewidth of control signal SGX. In this case, sub-circuits 102 and 103 may each include at least one delay capacitor 123 connected to a node within delay chain 122 via switching transistor 124. Control circuit 130 selectively activates switching transistor 124 so as to connect delay capacitor 123 within delay chain 122 and thereby increase the propagation delay therethrough. In this way, control circuit 130 may be utilized to substantially accurately control the timing between bootstrap circuit 108 and pull-up device 105.

Although FIG. 3 illustrates two delay capacitors 123 being connected to the same control signal Short generated by control circuit 130, it is understood that each delay capacitor 123 may be connected to a distinct control signal (not shown for reasons of simplicity).

It is understood that instead of controlling the timing for temporarily activating pull-up devices 105 based upon the corresponding control signal SGX and the delay through delay chain 122, control circuit 130 may generate a control signal that is directly connected to the control terminal of pull-up transistor 105.

The operation of driver circuit 100 according to a preferred embodiment of the present invention will be described with reference to FIG. 4. In this example, current flowing through write head 101 from write head terminal 101B to write head terminal 101A is considered a positive current direction, and current flowing in the opposite direction is considered a negative current direction. It is assumed that, for each sub-circuit 102 and 103, control circuit 130 has been previously programmed to generate control signals SGX to have a leading edge that is substantially synchronous with the leading edge of their respective control signal SDX, and to have the desired pulsewidth. Similarly, it is assumed that control circuit 130 has been previously programmed to short the desired inverters 124 in inverter chains 122 so that the pull-up transistors 105 are activated as desired relative to the timing for corresponding bootstrap circuits 108.

At time T0, driver circuit 100 is configured in a steady state in which pull-up transistor 104 of sub-circuit 102 is activated to provide a steady state current -Iss through write head 101 via write head terminal 101A, and current sink circuit 106 of sub-circuit 103 is activated to sink the steady state current from write head 103 through write head terminal 101B. In particular, control circuit 130 drives control signal $SDX_{102}$ of sub-circuit 102 to a low logic level, and control signal $SDX_{103}$ of sub-circuit 103 to a high logic level. Control signals SGX of sub-circuits 102 and 103 are each driven to a low logic level, thereby creating a voltage drop across capacitor 109 of sub-circuit 102 which approximates the difference between the high voltage reference (Vdd) and the low voltage reference (Vss).

At time T1, driver circuit 100 initiates the reversal of current flow through write head 101. Control signal $SDX_{102}$ of sub-circuit 102 is driven to the high logic level which deactivates pull-up transistor 104 of sub-circuit 102 and activates transistor 114 of sub-circuit 102 so that current from current source 113 is provided to transistor 106A of current mirror/sink circuit 106 of sub-circuit 102. At this same time, control signal $SDX_{103}$ of sub-circuit 103 is driven to the low logic level to activate pull-up transistor 104 of sub-circuit 103 and to deactivate current sink circuit 106 of sub-circuit 103 (by removing the current flowing to and otherwise turning off transistor 106A of sub-circuit 103).

In addition, control signal $SGX_{102}$ of sub-circuit 102 is driven to a high logic level at time T0, which drives terminal 109B of capacitor 109 towards the low voltage reference, Vss, thereby activating pull-up transistor 117 so as to provide a relatively large amount of current to transistor 106A of sub-circuit 102. With current provided to transistor 106A through pull-up transistor 117 and current source 113 and with the gate terminal of transistor 106A no longer being driven to Vss, the current mirror of current sink circuit 106 is activated to pass a relatively substantial amount of current through corresponding transistor 106B. Combined with the fact that terminal 109A of capacitor 109 of sub-circuit 102 is pulled below Vss by an amount substantially comparable to the voltage drop initially appearing across capacitor 109, the voltage appearing at write head terminal 101A is pulled rather rapidly below Vss. The resulting large voltage differential appearing across write head 101, combined with current sink circuit 106 of sub-circuit 102 now being enabled to sink a relatively large amount of current, causes a relatively large amount of current to flow from write head 101 through write head terminal 101A and thereby to rapidly transition towards the destination steady state current level Iss following time T1.

At time T1+Tprog1, the programmable period of time Tprog1 following time T1 and around the time the current level through write head 101 relatively slightly surpasses the destination steady state current level, Iss, control circuit 130 drives control signal $SGX_{102}$ of sub-circuit 102 to a low logic level. This deactivates pull-up transistor 117 of sub-circuit 102 so that current is no longer sourced to current sink/mirror circuit 106 therethrough. In addition, control signal $SGX_{102}$ of sub-circuit 102 being driven low serves to pull capacitor terminal 109A a diode voltage drop above Vss, thereby increasing the voltage appearing at write head terminal 101A slightly above vss. These events, pull-up transistor 117 ceasing to source current to current sink/mirror 106 and the voltage at write head terminal 101 increasing above Vss, substantially reduces the amount of current being drawn from write head 101. Consequently, the amount of current overshoot, relative to destination steady state current Iss, is reduced.

At or around time T1+Tprog1, the leading edge of control signal $SGX_{102}$ will have propagated through delay chain 122 of sub-circuit 102 so as to activate pull-up transistor 105 thereof. The activation of pull-up transistor 105 causes the voltage appearing at write head terminal 101A to be pulled towards Vdd, thereby decreasing the voltage across write head 101, which thereupon forces a more constant current through write head 101. The combination of bootstrap circuit 8 turning off, pull-up transistor 117 turning off, and pull-up transistor 105 turning on within sub-circuit 102 hastens write head 101 and driver circuit 100 to pass the destination steady state current level Iss through write head 101.

At time T1+2*Tprog1, corresponding to the propagation delay through delay chain 122 (Tprog1) plus the pulsewidth of control signal SGX (Tprog1) following time T1, the trailing edge of control signal $SGX_{102}$ will have propagated through delay chain 122 of sub-circuit 102 so as to deactivate pull-up transistor 105 thereof. At this time, the voltage at write head terminal 101A has substantially approached the voltage at write head terminal 101B, so as to force the current through write head 101 substantially at the steady state current level Iss. After pull-up device 105 of sub-circuit 102 has been deactivated, the current level passing through write head 101 undergoes relatively minor variations (current overshoots and undershoots) until driver circuit 100 and write head 101 reach the destination steady state condition.

Figure 4:
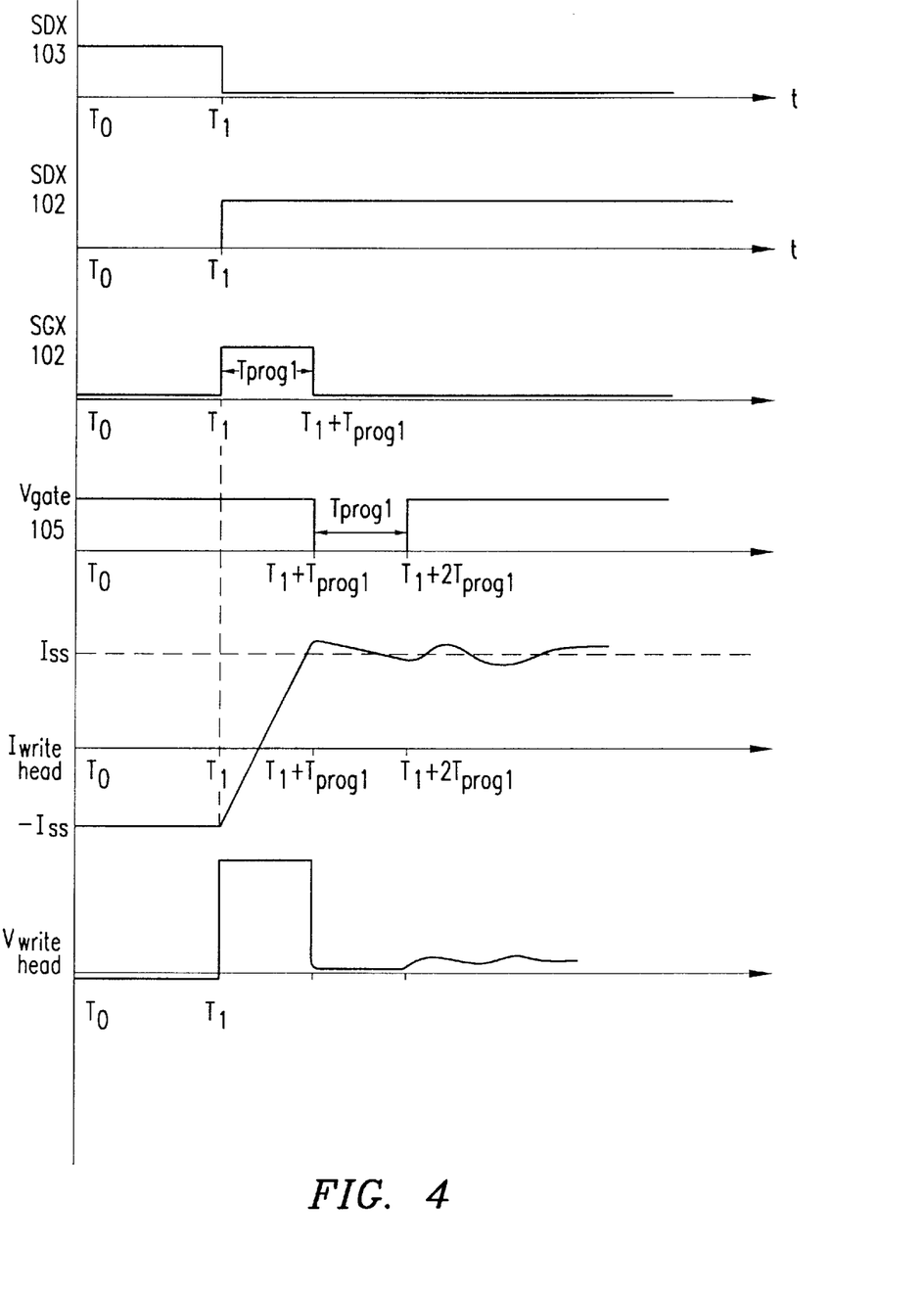
FIG. 4 illustrates a timing diagram corresponding to the operation of the driver circuit and sub-circuits, respectively shown in FIGS. 2 and 3.

It is noted that the waveforms of write head 101 in FIG. 4 show that the write head current slightly decreases between times T1+Tprog1 and T1+2*Tprog1, and that the voltage across write head 101 is slightly above zero volts between times T1+Tprog1 and T1+2*Tprog1. These waveform characteristics are due in part to write head 101 not completely following the behavior of an inductance.

It is understood that driver circuit 100 and write head 101 operate in a symmetrical manner to the above-described operation when driver circuit 100 causes the current flowing through write head 101 to reverse direction from the steady state current level Iss to the steady state current level -Iss. Accordingly, such current direction reversal will not be described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive circuit for the write head of a disk storage device, comprising:

a first pull-up device connected between a terminal of the write head and a high voltage reference and selectively activated to provide a current to the write head;

a current sink connected between the terminal of the write head and a low voltage reference and selectively activated to sink current from the terminal of the write head;

a boost circuit coupled to the write head terminal and selectively activated to pull the write head terminal below the low voltage reference; and control circuitry, electrically coupled to the boost circuit and the current sink, for activating the boost circuit and the current sink to pull the write head terminal below the low voltage reference for a first predetermined period of time.

2. The drive circuit of claim 1, wherein:

the boost circuit and the current sink are activated by the control circuit so as to have substantially the same activation start time.

3. The drive circuit of claim 1, wherein:

the control circuit activates the boost circuit to pull the write head terminal below the low voltage reference during the time current through the write head transitions from a first current level to a second current level, the second current level having an opposite polarity relative to the first current level.

4. The drive circuit of claim 3, wherein:

the control circuit activates the current sink during the time the current through the write head transitions from the first current level to the second current level and during the time the second current level flows through the write head.

5. The drive circuit of claim 4, wherein:

the current sink comprises a current mirror having a first leg and a second leg through which current flowing through the first leg is mirrored, the second leg being connected to the write head terminal so as to form a current path therebetween; and the boost circuit is connected to the second leg of the current mirror in a current path between the write head terminal and the low voltage reference so as to pull a node in the second leg below the low voltage reference when activated.

6. The drive circuit of claim 5, further comprising:

a first switching circuit, controlled by the control circuit, for providing a third current level to the first leg of the current mirror during the time the current mirror is activated by the control circuit, the second current level being proportional to the third current level.

7. The drive circuit of claim 6, wherein, the first switching circuit comprises:

a current source which supplies a current substantially at the third current level;

a first logic inverter having an input controlled by the control circuit; and a second logic inverter having a pull-up transistor connected between the current source of the first switching circuit and the first leg of the current mirror, and a pull-down transistor connected between the first leg of the current mirror and the low voltage reference.

8. The drive circuit of claim 6, further comprising:

a second switching circuit, controlled by the control circuit, for providing a fourth current to the first leg of the current mirror during the time the boost circuit is activated.

9. The drive circuit of claim 1, wherein:

the current sink comprises a current mirror having a first leg and a second leg through which current flowing through the first leg is mirrored, the second leg being connected to the write head terminal so as to form a current path therebetween; and the boost circuit is connected to the second leg of the current mirror so as to pull a node in the second leg below the low voltage reference when activated.

10. The drive circuit of claim 1, wherein:

the time during which the boost circuit is activated by the control circuit to pull the write head terminal below the low voltage reference is programmable.

11. The drive circuit of claim 1, further comprising:

a second pull-up device connected between the high voltage reference and the write head terminal and having a control terminal driven by the control circuit;

the control circuit deactivates the second pull-up device during the time the boost circuit is activated to pull the write head terminal below the low voltage reference, and activates the second pull-up device thereafter for a second predetermined period of time.

12. The drive circuit of claim 11, wherein:

the second predetermined period of time is programmable.

13. The drive circuit of claim 11, wherein:

the second predetermined time period is substantially the same as the first predetermined time period.

14. The drive circuit of claim 11, wherein:

initial activation of the second pull-up device by the control circuit occurs a third predetermined period of time following initial activation of the boost circuit.

15. The drive circuit of claim 11, wherein:

the control circuit activates the second pull-up device until the voltage appearing across the write head is approximately zero.

16. The drive circuit of claim 1, further comprising:

a transistor connected in series between the first pull-up device and the terminal of the write head, the transistor being biased to provide a voltage drop between the first pull-up device and the write head terminal.

17. The drive circuit of claim 16, wherein:

the first pull-up device comprises a transistor having a breakdown voltage that is substantially the same as the breakdown voltage of transistors in the current sink and the control circuit.

18. A method of controlling the write head of a disk storage device, comprising the steps of:

sourcing a current to a terminal of the write head so that current flows through the write head at a first current level;

sinking current from the terminal of the write head so that the current flowing through the write head transitions from the first current level towards a second current level having an opposite polarity relative to the first current level;

sinking the second current level from the write head terminal towards a low voltage reference following the step of sinking current; and during at least a portion of the step of sinking current, pulling the terminal of the write head below the low voltage reference.

19. The method of claim 18, wherein:

the step of sinking current and the step of pulling the write head terminal are started at the same time.

20. The method of claim 18, wherein:

the step of pulling the write head terminal pulls the write head terminal below the low voltage reference for a predetermined period of time.

21. The method of claim 20, further comprising the step of:

programming the predetermined period of time prior to the step of sourcing current.

22. The method of claim 18, further comprising the step of:

temporarily pulling the write head terminal towards the high voltage reference substantially immediately following the step of pulling the write head terminal to a voltage below the low voltage reference.

23. The method of claim 22, wherein:

the write head terminal is pulled towards the high voltage reference for a predetermined period of time during the step of temporarily pulling the write head terminal.

24. The method of claim 23, further comprising the step of:

programming the predetermined period of time prior to the step of sourcing a current.

25. The method of claim 22, wherein:

the write head terminal is pulled towards the high voltage reference until the voltage across the write head is approximately zero volts.

26. The method of claim 18, wherein:

a greater amount of current is sunk from the write head terminal during step of sinking current than the amount of current sunk from the write head terminal during the step of sinking the second current level.

27. A write head drive circuit for a disk storage device, comprising:

a first sub-circuit connected to a first terminal of the write head, comprising a current source device connected between the first terminal and a high voltage reference, and a current sink device connected between the first terminal and a low voltage reference;

a second sub-circuit connected to a second terminal of the write head, comprising a current source device connected between the second terminal and the high voltage reference, and a current sink connected between the second terminal and the low voltage reference, the first and second sub-circuits together forming an H-bridge driver circuit;

a control circuit connected to the first sub-circuit and the second sub-circuit, for controlling current flow through the write head such that the control circuit selectively configures the first and second sub-circuits in a first steady state wherein current flows from the current source of the first sub-circuit through the current sink of the second sub-circuit, and in a second steady state wherein current flows from the current source of the second sub-circuit through the current sink of the first sub-circuit; and a boost circuit, controlled by the control circuit, for providing a voltage across the write head that exceeds the voltage difference between the high and low voltage references when the first and second sub-circuits are transitioning between the first and second steady states.

28. The write head drive circuit of claim 27, wherein:

the boost circuit comprises a first bootstrap circuit connected to the current sink of the first sub-circuit, the bootstrap circuit being activated when the first and second sub-circuits are transitioning from the first steady state to the second steady state, the bootstrap circuit pulls the first terminal of the write head below the low voltage reference when activated.

29. The write head drive circuit of claim 28, wherein:

the bootstrap circuit is activated for a predetermined period of time during the time the first and second sub-circuits transition from the first steady state to the second steady state.

30. The write head drive circuit of claim 29, wherein:

the predetermined period of time is programmable.

31. The write head drive circuit of claim 28, wherein:

the current sink of the first sub-circuit comprises a current mirror, the current mirror being activated by the control circuit when the first and second sub-circuits are configured in the second steady state and when the first and second sub-circuits are transitioning from the first steady state to the second steady state; and the first sub-circuit further includes switching logic controlled by the control circuit, for providing current to the current mirror when the first and second sub-circuits are in the second steady state and when transitioning to the second steady state, the amount of current provided to the current mirror when the first and second sub-circuits are in the second steady state is less than the amount of current provided to the current mirror when the first and second sub-circuits are transitioning to the second steady state.

32. The write head drive circuit of claim 28, wherein:

the current source of the first sub-circuit comprises a first pull-up device activated by the control circuit to provide a current to the first write head terminal when the first and second sub-circuits are configured in the first steady state, and a second pull-up device activated by the control circuit to provide a current to the first write head terminal for a period of time immediately following the deactivation of the boost circuit.

33. The write head drive circuit of claim 32, wherein:

the period of time during which the second pull-up device is activated is predetermined.

34. A driver circuit for the write head of a disk storage device, comprising:

a pull-up device, the pull-up device being selectively activated to provide a current to a terminal of the write head;

a first transistor connected in series between the pull-up device and the terminal of the write head, the first transistor having a control terminal that is biased to provide a voltage differential between the terminal of the write head and the pull-up device and keep the first transistor substantially continuously turned on; and at least one current sink coupled to the terminal of the write head, the current sink being selectively activated to sink current from the write head.

35. The driver circuit of claim 34, wherein:

the pull-up device includes a second transistor connected between the first transistor and a reference voltage source;

the at least one current sink includes a plurality of third transistors; and the first transistor, second transistor and third transistors have substantially the same gate oxide thickness.

36. The driver circuit of claim 34, wherein:

the pull-up device includes a second transistor connected between the first transistor and a reference voltage source;

the at least one current sink includes a plurality of third transistors; and the first transistor, second transistor and third transistors have the same breakdown voltage.

37. A drive circuit for the write head of a disk storage device, comprising:

a first pull-up device coupled to a terminal of the write head of the disk storage device and selectively activated;

a second pull-up device coupled to the terminal of the write head of the disk storage device and selectively activated;

a current sink circuit coupled to the terminal of the write head and selectively activated;

a control circuit for activating the first pull-up device, the second pull-up device and the current sink circuit so as to switch the drive circuit between a first condition in which a first current level is provided to the write head by the first pull-up device and a second condition in which a second current level is drawn from the write head by the current sink circuit, the control circuit deactivating the first pull-up device and temporarily activating the second pull-up device when the drive circuit transitions from the first condition to the second condition.

38. The drive circuit of claim 37, wherein the control circuit temporarily activates the second pull-up device so as to bring the voltage across the write head to be approximately zero volts.

39. The drive circuit of claim 37, further comprising a boost circuit, controlled by the control circuit so as to temporarily pull, substantially immediately prior to the second pull-up device being activated, the terminal of the write head below a low reference voltage to which the current sink circuit is coupled.

40. The drive circuit of claim 39, further comprising switching circuitry, controlled by the control circuit, for sinking from the terminal of the write head a first current level during the time the terminal is below the low reference voltage, and a second current level thereafter.

41. The drive circuit of claim 1, wherein the current sink comprises a diode coupled between the low voltage reference and the terminal of the write head, for preventing current flow from the low voltage reference towards the terminal of the write head.

42. A drive circuit for the write head of a disk storage device, comprising:

a first pull-up device connected between a terminal of the write head and a high voltage reference and selectively activated to provide a current to the write head;

a current sink connected between the first terminal of the write head and a low voltage reference and selectively activated to sink current from the first terminal of the write head;

a boost circuit coupled to the write head terminal and selectively activated to pull the write head terminal to a voltage level that is greater in magnitude than the magnitude of at least one of the high voltage reference and low voltage reference; and control circuitry, electrically coupled to the boost circuit, for temporarily activating the boost circuit during the time current in the write head transitions between steady state current levels.

* * * * *